Dec. 25, 1956   B. R. BETTER ET AL   2,775,326
TORQUE DRIVERS
Filed Oct. 23, 1952   4 Sheets-Sheet 1
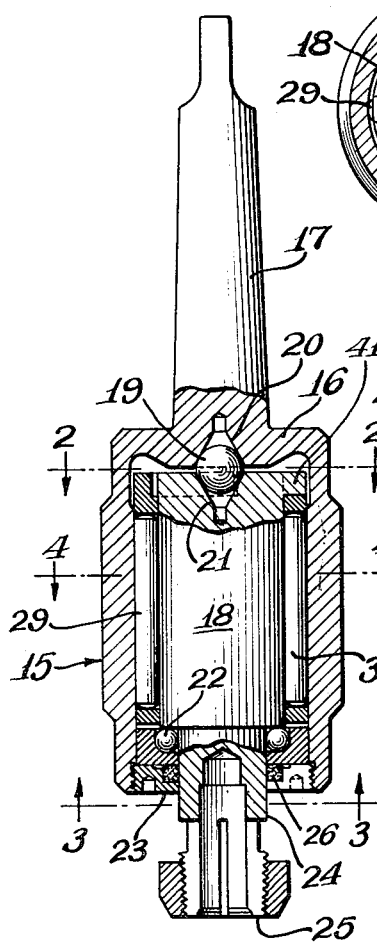
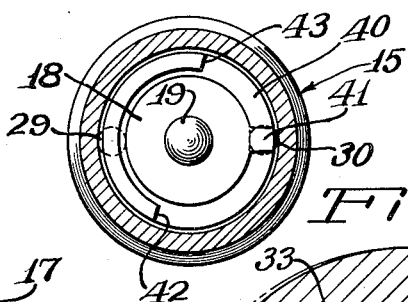
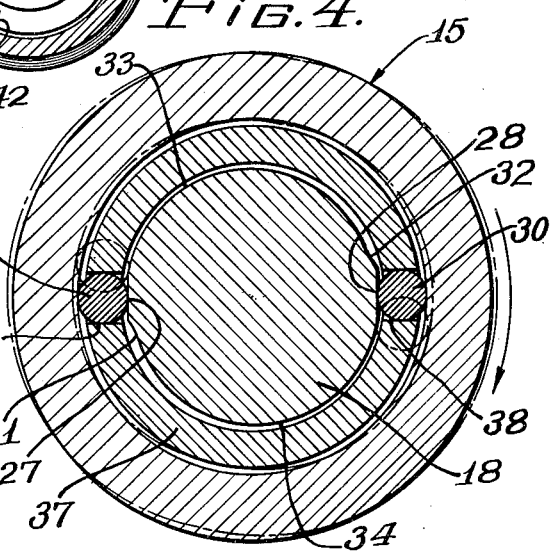
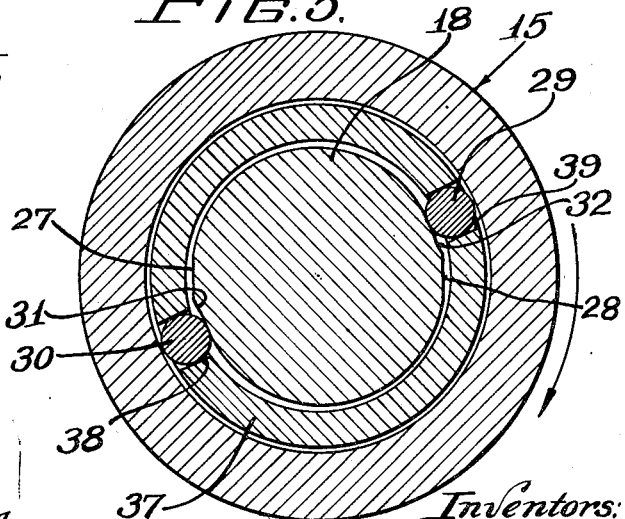
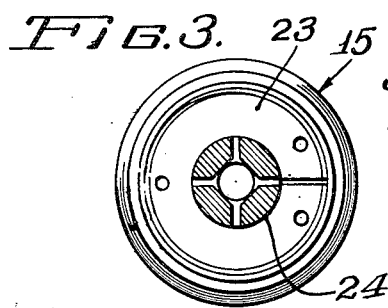
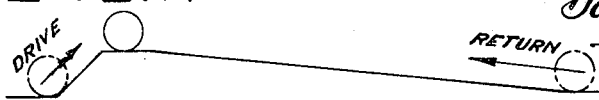
Inventors:
Bernard R. Better
John W. Lehde Jr.
By Glenn S. Noble
Atty.

Dec. 25, 1956    B. R. BETTER ET AL    2,775,326
TORQUE DRIVERS
Filed Oct. 23, 1952     4 Sheets-Sheet 2
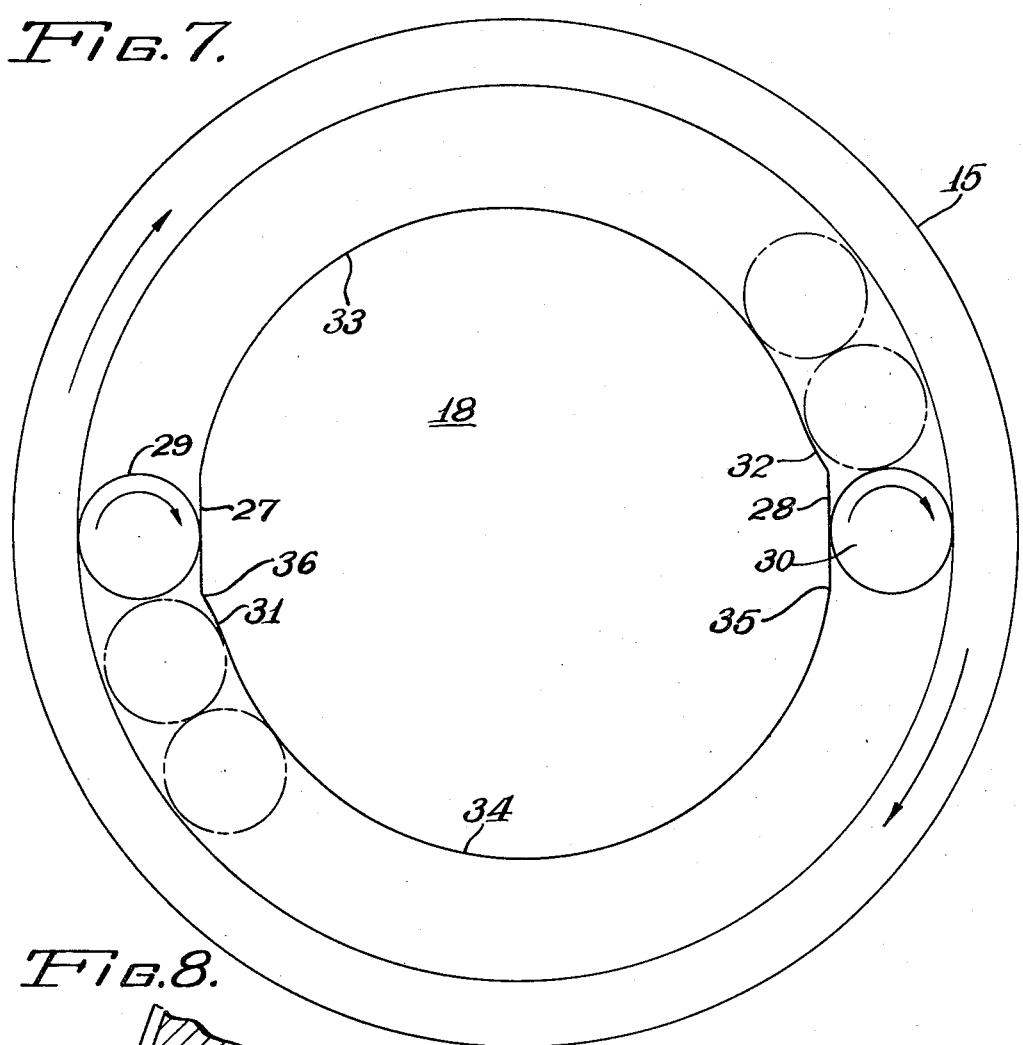
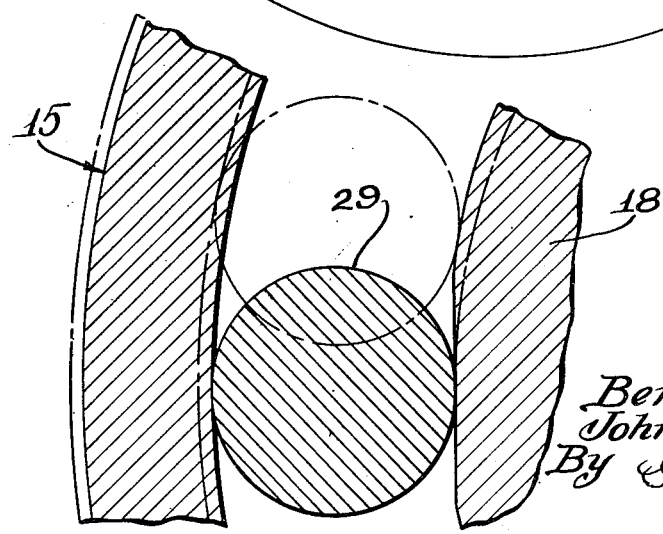
Inventors:
Bernard R. Better
John W. Lehde Jr.
By Glenn S. Noble
Atty.

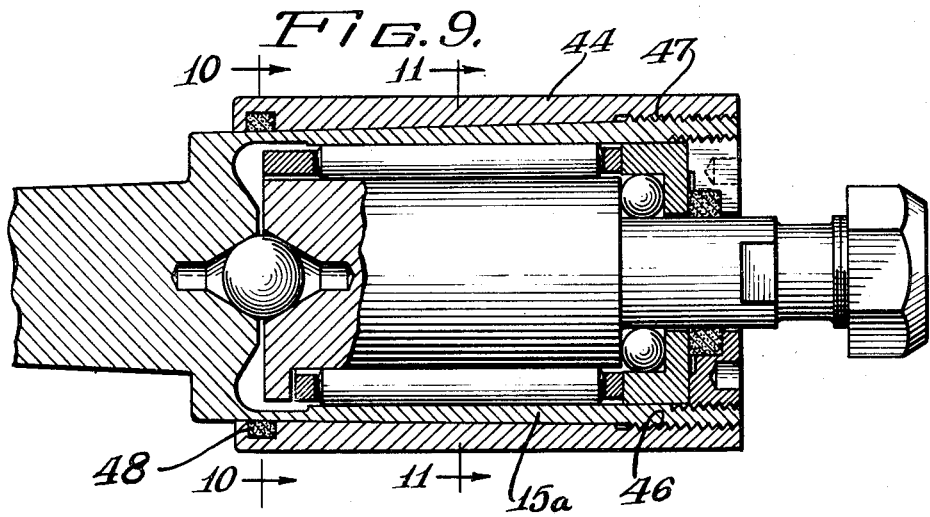
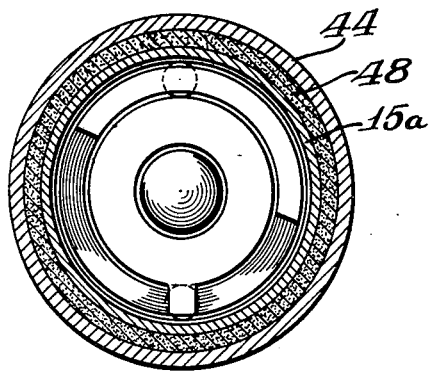
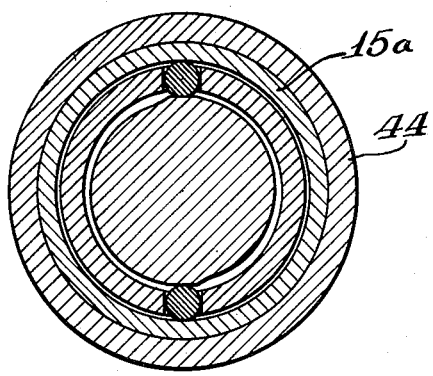
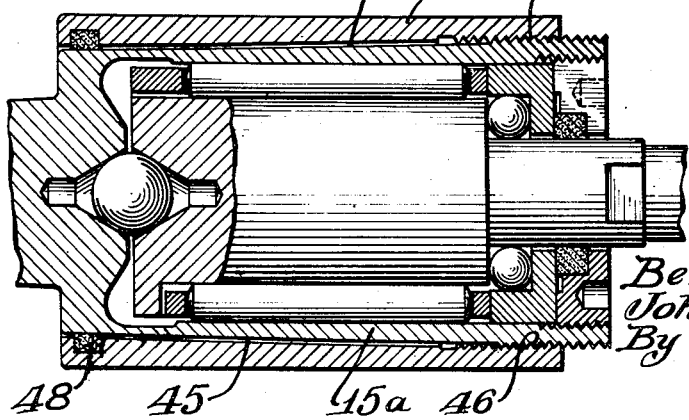

Dec. 25, 1956 — B. R. BETTER ET AL — 2,775,326

TORQUE DRIVERS

Filed Oct. 23, 1952 — 4 Sheets-Sheet 4

Fig.13.
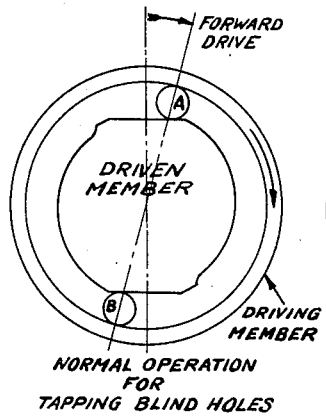
NORMAL OPERATION FOR TAPPING BLIND HOLES

Fig.14.
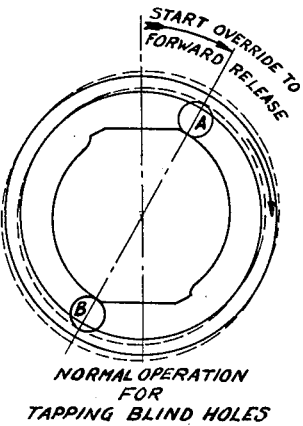
NORMAL OPERATION FOR TAPPING BLIND HOLES

Fig.15.
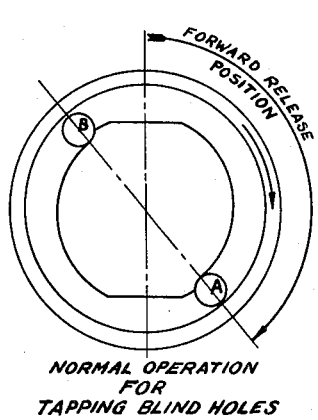
NORMAL OPERATION FOR TAPPING BLIND HOLES

Fig.16. (SPINDLE REVERSING)
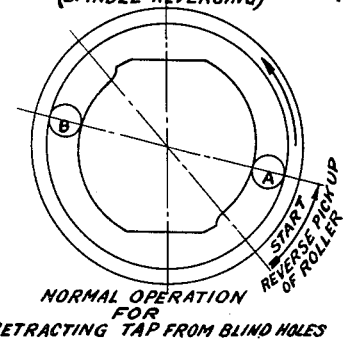
NORMAL OPERATION FOR RETRACTING TAP FROM BLIND HOLES Fig.17. LOW TORQUE (SPINDLE REVERSING)
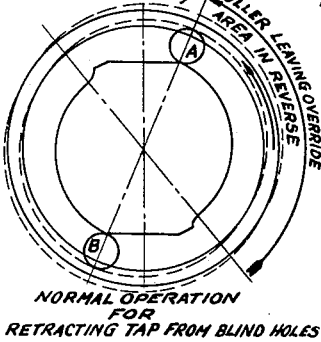
NORMAL OPERATION FOR RETRACTING TAP FROM BLIND HOLES Fig.18. (SPINDLE REVERSING)
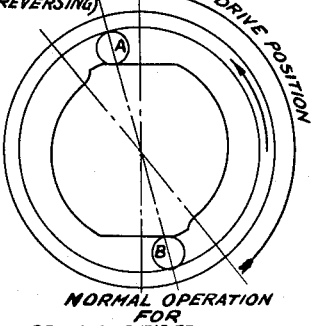
NORMAL OPERATION FOR RETRACTING TAP FROM BLIND HOLES Fig.19.
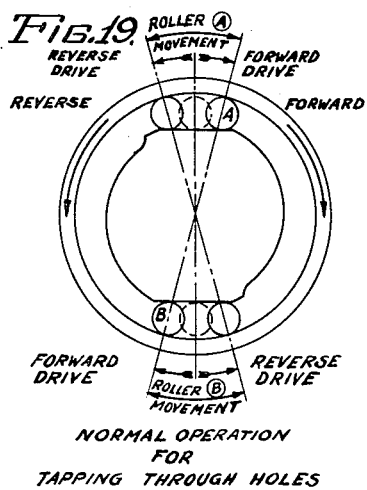
NORMAL OPERATION FOR TAPPING THROUGH HOLES Fig.20. (SAFETY)
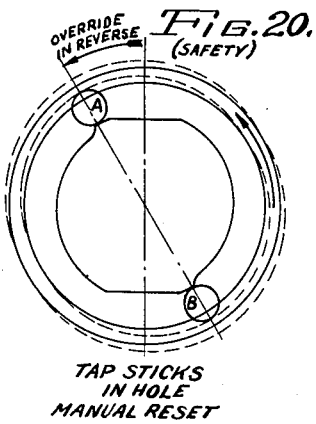
TAP STICKS IN HOLE MANUAL RESET Fig.21. (SAFETY)
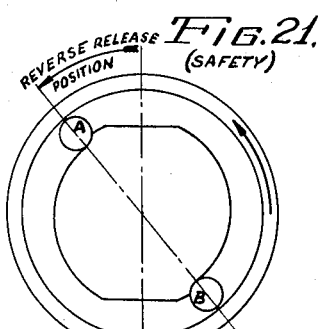
TAP STICKS IN HOLE MANUAL RESET Inventors:
Bernard R. Better
John W. Lehde Jr.
By Glenn S. Noble
Atty.

United States Patent Office 2,775,326
Patented Dec. 25, 1956

2,775,326

TORQUE DRIVERS

Bernard R. Better and John W. Lehde, Jr., Chicago, Ill., assignors to Scully-Jones and Company, Chicago, Ill., a corporation of Illinois Application October 23, 1952, Serial No. 316,506

7 Claims. (Cl. 192—56)

This invention is intended for use for various purposes as will be readily understood from the description, but is particularly adapted for use as a tap driver and will be described principally in this connection. It embodies novel means for stopping the turning action when the strain reaches a predetermined amount and fully releasing the torque or twist on the tap until reset.

One of the principal features of the invention is the use of over-riding rollers and an elastic shell or driving member similar in its driving action to a roller clutch but differing from it in that the rollers are able to leave the driving cams completely when the torque becomes excessive by passing over the raised portions on the driven member and simultaneously deforming the elastic shell.

As shown in the accompanying drawings,

Fig. 1 is a longitudinal sectional view of our improved torque driver with parts broken away for convenience in illustration;

Fig. 2 is a cross sectional view taken on the line 2—2 of Fig. 1;

Fig. 3 is a sectional view taken on the line 3—3 of Fig. 1;

Fig. 4 is a sectional view taken on the line 4—4 of Fig. 1;

Fig. 5 is an enlarged detail sectional view similar to Fig. 4 illustrating one step of movement of the rollers;

Fig. 6 is a diagrammatic view illustrating the cam action of the rollers on the cams of the driven member;

Fig. 7 is an enlarged diagrammatical view illustrating the operation of the clutch or driving mechanism;

Fig. 8 is a detailed fragmentary view further illustrating the operation of the device;

Fig. 9 is a longitudinal sectional view of a modified form of the torque driver showing means for adjusting the driving torque or twisting moment to be applied to the tap or other tool;

Fig. 10 is a cross sectional view taken on the line 10—10 of Fig. 9;

Fig. 11 is a cross sectional view taken on the line 11—11 of Fig. 9; and

Fig. 12 is a longitudinal sectional view to illustrate the action of the adjusting means.

Figs. 13–21 inclusive are diagrammatic views showing the movements of the parts during various operations.

As shown in these drawings, 15 is a cylindrical or cup-shaped driving member having one end closed as shown at 16 and provided with a tank or any suitable means 17 for connection with the machine tool or tap driver to be used for actuating the same. The driven member 18 is mounted in the driving member and is held in central position at one end by the ball 19 which fits in a conical recess 20 in the driving member and a similar recess 21 in the driven member. The opposite end of the driven member is mounted in a ball bearing 22 as shown and these parts are held in position by a threaded ring 23 in the end of the driving member. The driven member has a reduced extension 24 that extends out through the threaded ring and is provided with any suitable means such as a collet 25 for receiving the tap or other tool to be driven. The threaded member 23 is preferably provided with a packing or washer 26 to prevent dirt from entering around the extension 24.

As best illustrated in Fig. 7, the driven member 18 has two oppositely disposed flat areas 27 and 28 which are substantially parallel and which provide the driving cam surfaces for the two rollers 29 and 30, this arrangement being similar to an ordinary roller or ball clutch. Adjacent to the flat surfaces 27 and 28 are somewhat similar substantially flat surfaces 31 and 32 which are diametrically opposed but which are not tangential to the surface of the driven member, but are slightly inclined to give a less pitch for contact with the rollers.

A cylindrical cam or roller releasing surface 33 extends from one side of the flat 27 around to one edge of the secondary flat surface 32, this cam surface being eccentric with respect to the driven member and at its lowest or extreme end leaves sufficient clearance between it and the inner surface of the driving member 15 to provide clearance for the rollers as indicated in Fig. 7.

A complementary cam or roller releasing surface 34 which is at 180° to the surface 33 extends from one edge 35 of the flat 28 to the edge 36 of the flat surface 31. This cam is also substantially cylindrical, but slightly eccentric to the axis of the driving member whereby the space between the cam and the inner surface of the driving member is sufficient to release the rollers when they are at the low portion of the cam.

The driving rollers 29 and 30 are held in operative positions by means of a cylindrical cage 37 which is positioned between the driving and driven members and provided with longitudinal slots 38 and 39 for receiving the rollers. In order to limit the turning movement of the driven member with respect to the cage and thus limit the circumferential movement of the rollers to predetermined distances, one end of the cage is provided with a peripheral recess 40 which is engaged by a tang or lug 41 extending radially from the adjacent end of the driven member as shown particularly in Figs. 1 and 2. The relative movements of the rollers circumferentially is limited by the lug 41 being stopped by the shoulders 42 and 43 at the ends of the recess 40.

With the driving and driven members in the position shown in Fig. 7 and the rollers 29 and 30 in the positions indicated at the centers of the flats or driving cams 27 and 28 and the driving member starting to rotate in the position indicated by the arrows, the following actions will occur as soon as resistance is put upon the driven member as in the action of tapping. The driving rollers will tend to be compressed or exert turning action on the driven member as is usual with roller clutches. However, in this instance, a radical change occurs when the resistance becomes too great, the driving cylinder or member 15 is resilient and when the resistance becomes too great, the rollers will pass over the humps or high spots at the limits of the driving cams and cause the driving member to be distorted adjacent to the rollers and at the same time it will contract or be flattened on the diameter at substantially 90° from the points where the pressure is applied. It will thus be seen that the driving member will act as a ring spring or cylinder subjected to diametrically opposed internal forces. As soon as the rollers pass the humps or high spots, they will roll along the cylindrical releasing surfaces 33 and 34 and will minimize the driving forces due to the rolling friction being the only effective force at this time. As they roll down these cylindrical releasing surfaces to the lowermost points, there will be no force at all exerted on the rollers which are held in such positions by the roller cage. Consequently the outer shell may revolve freely around the stationary driven member and due to this complete release, no friction heat is generated as is apt to occur with other types of drivers. This also eliminates any noisy clashing of disengaging or engaging clutch members such as also is apt to occur with other types of drivers. Tap breakage is almost completely eliminated by having the tap completely released from the drive of the spindle of the operating machine tool. When the operator reverses the spindle to withdraw the tap from the hole, the shell or driving member 15 will start revolving in the opposite direction, the driven member remaining stationary.

Grease is usually applied between the driving and driven members and this tends to exert a slight drag on the rollers to start them in reverse direction and as soon as they impinge on the opposed surfaces, they will be driven by the driving member and cause the driven member to turn sufficiently to reverse the tap and turn it out of the tapped hole. It will be noted that less torque is produced when the rollers move back along the cylindrical surfaces 33 and 34 to their original positions. This reduced amount of torque is of importance because it takes less torque to reverse the tap out of the hole than to drive the tap into position.

There are a number of complex operations involved in tapping as for instance, in tapping blind holes, the tap will be stopped when it reaches the bottom of the hole, whereas in tapping through holes as through plates or the like, there is no resistance after the tap has completed its operation unless there is some unforeseen resistance. Fig. 13 shows the normal operation for tapping blind holes in which the rollers are driven in the manner shown against the driving flats of the driven member. When the resistance becomes too great, the rollers start to override the driving flats as shown in Fig. 14 and enter the release areas as shown in Fig. 15. Thereupon the spindle is reversed and the action takes place as shown in Fig. 16 in which the grease between the driving and driven members tends to cause the rollers to move to driving positions where they engage driving portions of the flats as show in Figs. 17 and 18. These figures showing the normal operation for retracting taps from blind holes.

It will be noted that the roller A as shown in Fig. 16 has substantially left its releasing position where it was left before the spindle was reversed. As soon as the spindle and driving member were reversed, the inner surface of the driving member caused the rollers to move out of their operating position due to the slight drag incident to the reversal of the driving member. As the rollers proceed between the adjacent surfaces of the driving member and the driven member, the rollers will be further slightly pinched until they reach the position shown substantially in Fig. 17 where they impinge on the less steep return drive which provides sufficient force to turn the driven member and withdraw the tap from the hole. If there is undue resistance, the rollers will pass over these less steep return drives into the flat areas as shown in Fig. 18. The grease, however, has no substantial action insofar as the actual driving of the tap either in tapping or being withdrawn is concerned.

Fig. 19 illustrates the normal operation for tapping through holes in which the driven member is first actuated for the tapping operation and is then reversed for withdrawing the tap. In this operation, if the tap sticks in the hole, the rollers will override the driving cams and enter the non-driving positions as shown in Fig. 21 whereupon there will be no further torque exerted on the tap and the tap must be manually reset by the operator.

It will be understood that the various elements of our improved torque driver must be made of suitable material and engineered for the various operations to be performed. The outer shell or driven member is subjected to the distorting action of the rollers when they pass over the humps or high spots of the cams and the parts must be so proportioned that the distortion of the driving member will not cause it to be stressed beyond the elastic limit of the particular material of which it is made. Having this in mind, the driving member will retain its elasticity or act as a spring almost indefinitely. The rollers are also subjected to extreme compressive stresses and suitable material must be used in order to prevent injury from such stresses. By following the practice of good design and staying safely within the limitations of the physical properties of the components, the torque driver may be made almost completely wear-resistant overcoming only rolling friction. As a consequence, the driver should last almost indefinitely.

The device as described may be considered as a tap driver with a fixed torque which adapts it for driving one size of tap and for tapping a certain type of material. However, in order to change the maximum torque at which the tool should release, various means may be provided primarily embodying changes in the structural parts. One means is to reduce the effective contact length of the rollers which may be done by inserting rollers of smaller diameter or by grinding the rollers down partway whereby there will be a reduction in the torque at which release is obtained. Other means of reducing the ultimate torque will be apparent to those familiar with such devices, but we also provide means for adjusting the torque which is shown particularly in Figs. 9–12.

In the driver described, the distortion of the shell or driving member at the time the rollers override the humps in the cams is a measure of the greatest torque obtainable. In order to provide for reinforcement or strengthening of the shell in order to increase the torque, we provide another shell or cylinder 44 which fits over the driving member 15a and may have a slight clearance as shown at 45. The inner shell or driving member 15a is tapered as shown and is threaded at its larger end with threads 46. The outer shell or cylinder 44 is correspondingly tapered and is threaded at 47 for engagement with the threads 46. A packing ring or washer 48 is provided adjacent to the opposite end for keeping out dirt or the like. By means of this arrangement, the clearance between the two shells may be adjusted or the outer shell may be tightened against the inner shell with any desired degree of pressure.

When there is a clearance between the inner and outer shells, and the driver is being used, the inner shell or driving member will be distorted until it presses against the outer shell, then both shells will be distorted simultaneously. This adds to the resistance of the inner shell which may be suitably adjusted by varying the clearance between the shells or by increasing the pressure of the outer shell against the inner shell.

With this arrangement, it will be seen that the two shells act in a smiliar manner as leaf springs, the leaves of which are circular and which depend upon distortion for their spring action. Inasmuch as the outer shell is not in contact with the rollers, it is not necessary to have it made of wear resistant material or to be hardened. This arrangement of adjustment enables the tool to be made for a wide range of taps and materials or for other similar uses. From this description, it will be seen that our improved torque driver may be used not only for driving taps, but also for driving drills, for setting nuts or studs and with some modifications, the device may also be used as an expanding arbor or chuck for holding work pieces.

Having thus described our invention, what we claim is:

1. In a torque driver, the combination of a metallic integral, elastic cylindrical driving member, means for attaching the member to a machine tool, a driven member rotatively mounted in the driving member, said driven member having two driving cams or flats arranged at 180° apart the sides of which are elevated with respect to the adjacent surfaces and rollers interposed between the driving member and the driven member which serve to drive the driven member when they are positioned on the flats but which may override the elevated surfaces at the sides of the flats and consequently stretch the driving member outwardly under excessive torque, a sufficient amount to relieve the turning moment on the driven member but not beyond the elastic limit of the driving member.

2. A device as per claim 1, having an integral, driving cylindrical member, which is formed of sufficiently resilient metal so that it may be repeatedly distorted diametrically under internal force with a consequent contracting at substantially 90° from the points of distortion witho ut exceeding the elastic limit of the metal.

3. A torque driver comprising a cylindrical integral driving member formed of resilient material with integrally formed means for attaching the driving member to a machine tool, a driven member rotatably mounted in the driving member, a roller cage interposed between the driving member and the driven member and having slots at 180° apart, rollers mounted in said slots, cam-like driving flats on the opposite sides of the driven member having relatively high driving portions and lower releasing portions adapted to coact with the rollers whereby the driven member may be turned at times by the driving member, the arrangement being such that when the resistance on the driven member becomes sufficiently great, the rollers will roll over the high portions of the driving flats and cause the driven member to be distorted on opposite sides thereof, and the torque released from the driven member when the rollers have passed over said high driving portions.

4. A torque driver including a metallic resilient cylindrical driving member all of one piece, a driven member, means for rotatably mounting the driven member in the driving member, means for attaching the driven member to a tool to be actuated, said driven member having oppositely disposed substantially flat driving areas and having short auxiliary flat driving surfaces adjacent to said driving areas which are of less pitch than said areas, cylindrical cam releasing surfaces extending from the last named surfaces substantially around to the next flat area, rollers interposed between the driving and driven members, a cage for said rollers, means for stopping the cage in predetermined positions with respect to the driven member, the arrangement being such that when the rollers are on the driving areas, they may act as roller clutch drivers but when the resistance on the driven member becomes excessive, the rollers will pass over the sides of the driving areas and consequently distort the driving member, and will then pass along the releasing cam areas until they are free of contact with the driven member and the driven member amy remain stationary while the driving member continues turning.

5. A driving device for taps or the like, including an electric driving shell all of one piece, means for attaching the driving shell to a machine for turning the same, a substantially cylindrical driven member mounted in the driving member and provided with driving areas and releasing areas, rollers mounted between the shell and the driven member and coacting with said members for driving the driven member when in engagement with the driving areas and releasing the driven member when in engagement with the releasing areas, a cage for said rollers, a recess extending partway around one end of the cage, a projection on the driven member which coacts with the ends of said recess to limit the relative peripheral movement of the cage with respect to the driven member to hold the rollers in driving position or in fully released position, and means for connecting the driven member with a tool to be driven.

6. A distortionable integral driving cylinder for the purposes set forth which is tapered longitudinally and provided with threads at the end of the taper, and an auxiliary cylinder having a conical bore and fitting over the first named cylinder with threads engaging with the threads on the first named cylinder for longitudinal adjustment of the auxiliary cylinder.

7. In a safety torque driver, the combination of roller clutch driving means having a distortionable integral driving cylinder which is tapered on its outer surface, threads on said driving cylinder, and a second cylinder with its bore tapered to fit the driving cylinder and threaded for engagement with said threads, said second cylinder serving to adjustably reinforce the driving cylinder.

References Cited in the file of this patent

UNITED STATES PATENTS

| | | |
|---|---|---|
| 2,065,244 | Richards | Dec. 22, 1936 |
| 2,164,741 | Green | July 4, 1939 |
| 2,292,988 | Bloomfield et al. | Aug. 11, 1942 |
| 2,344,673 | Brown | Mar. 21, 1944 |
| 2,369,848 | Patterson | Feb. 20, 1945 |
| 2,668,426 | Hoover | Feb. 9, 1954 |